US012775440B2

(12) United States Patent
Agrawal et al.

(10) Patent No.: US 12,775,440 B2
(45) Date of Patent: Oct. 27, 2026

(54) MANAGING VOLUME CONTROL OF AN EXTERNAL AUDIO OUTPUT DEVICE VIA CONNECTED DEVICES

(71) Applicant: MOTOROLA MOBILITY LLC, Wilmington, DE (US)

(72) Inventors: Amit Kumar Agrawal, Bangalore (IN); Krishnan Raghavan, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 92 days.

(21) Appl. No.: 18/789,903

(22) Filed: Jul. 31, 2024

(65) Prior Publication Data

US 2026/0037210 A1 Feb. 5, 2026

(51) Int. Cl.
*G06F 3/16* (2006.01)

(52) U.S. Cl.
CPC .............. *G06F 3/165* (2013.01); *G06F 3/162* (2013.01); *G06F 3/167* (2013.01)

(58) Field of Classification Search
CPC . G06F 3/165; G06F 3/162; G06F 3/16; H04R 2430/01; H04R 2420/07; H04R 3/12; H04W 4/80; H04W 76/15
See application file for complete search history.

(56) References Cited

U.S. PATENT DOCUMENTS

| | | | | |
|---|---|---|---|---|
| 12,120,165 B2 * | 10/2024 | Lee | .......................... | G10L 19/24 |
| 2021/0247952 A1 * | 8/2021 | Kim | .......................... | H04R 5/04 |
| 2023/0289128 A1 * | 9/2023 | Park | .......................... | G06F 3/041 |
| 2024/0168698 A1 * | 5/2024 | Lee | ...................... | H04N 21/439 |

* cited by examiner

*Primary Examiner* — Vivian C Chin
*Assistant Examiner* — Shin Lee
(74) *Attorney, Agent, or Firm* — Isidore PLLC

(57) ABSTRACT

An electronic device, a method, and a computer program product provide a single input volume control across connected devices. The electronic device connects, via the communications subsystem, to a second electronic device having a second input control to establish an input sharing framework. The electronic device detects, via the input sharing, an audio output adjustment signal received from the second input control to change a volume of an audio output signal. In response to determining that the audio output signal is originating from the first electronic device, the electronic device adjusts the volume of the audio output signal based on the audio output adjustment signal and communicates the audio output signal at the adjusted volume to a corresponding one of the first audio output device of the electronic device or an external audio output device that presents the audio output signal.

20 Claims, 8 Drawing Sheets

MANAGING VOLUME CONTROL OF AN EXTERNAL AUDIO OUTPUT DEVICE VIA CONNECTED DEVICES

BACKGROUND

1. Technical Field

The present disclosure relates generally to communicatively connectable electronic devices, and more particularly to communicatively connectable electronic devices that each have controls for controlling volume of audio.

2. Description of the Related Art

As technology has advanced, uses for electronic devices have expanded. One such use is small mobile devices, such as smartphones, which have become increasingly powerful despite their small size. These mobile devices provide a great deal of portable processing power, but the small size limits the size and thus audio quality of integral audio speakers. External audio output devices such as a wireless speaker can provide a higher audio quality and a higher audio volume than handheld electronic devices. As another kind of external audio output device, earphones such as Truly Wireless Stereo (TWS) earphones are often used to provide better quality and personally delivered audio output. TWS earphones may communicatively couple to other electronic devices. For example, in addition to smartphones, users often have a number of electronic devices including desktop or laptop computers that provide a larger display and full keyboard and mouse input devices. Users may have a tablet computer and a smartwatch. Various entertainment systems and game consoles may support external audio output devices such as TWS earphones. With some unique capabilities present on each of the mobile device and second electronic device(s), e.g., larger display screen on a connected laptop device, users now communicatively connect the devices to provide cross-access to one or more of the device features.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
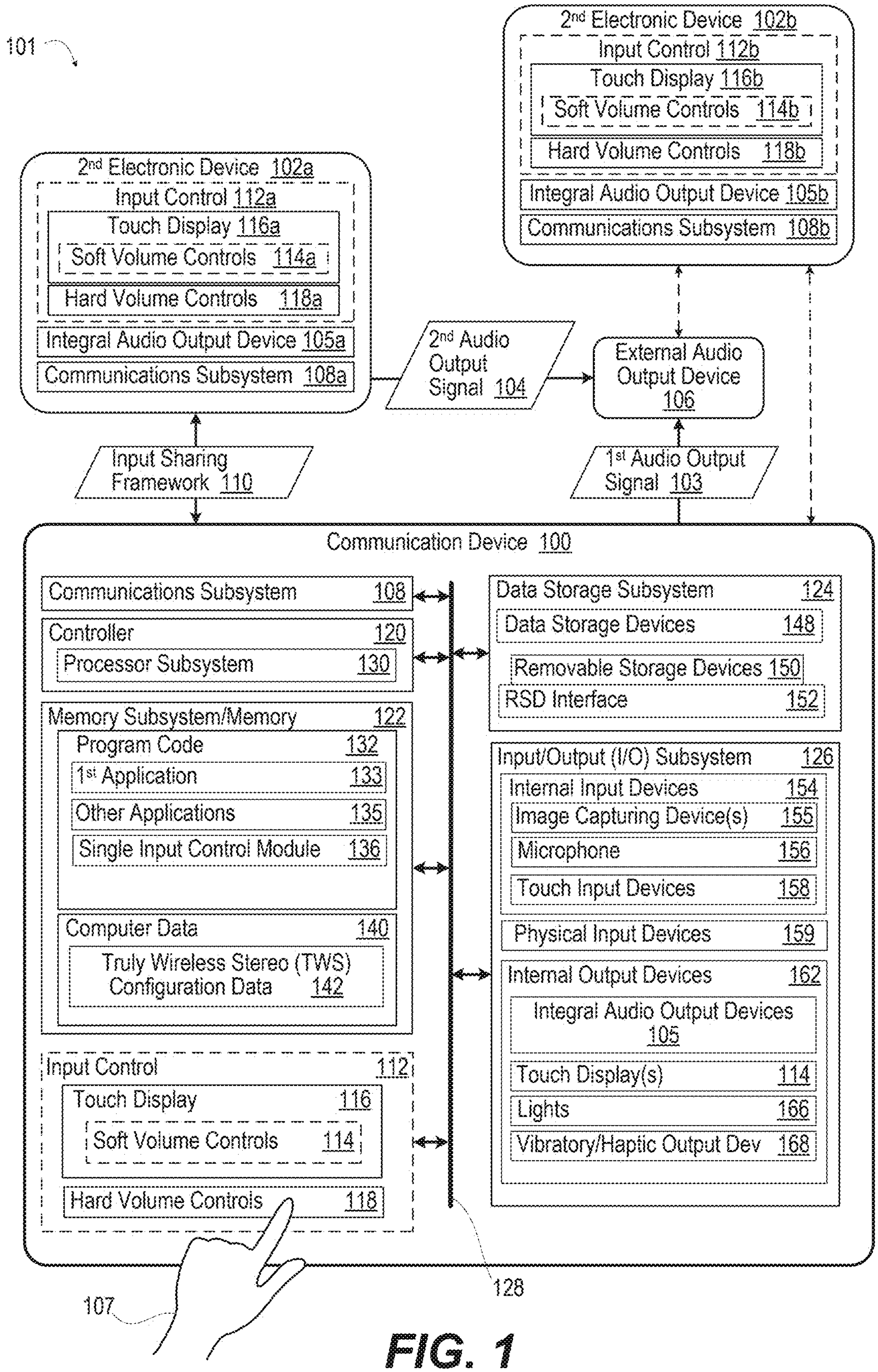
FIG. 1 presents a simplified functional block diagram of an electronic device in which the features of the present disclosure are advantageously implemented for single volume control input between connected devices, according to one or more embodiments.

According to aspects of the present disclosure, a first electronic device, method, and computer program product provide a single input volume control across connected devices. Recent innovations include multipoint external audio output devices such as true wireless stereo (TWS) headsets that may connect to multiple user devices for receiving and presenting audio signals. A user may work surrounded by a number of different user electronic devices, each having different audio output options. In an example, a user may use a smartphone to access a streaming music application and to receive voice calls. A laptop may be used for work-related conferencing. A game console may be used for playing a video game. With the convenience of TWS headsets, the user may quickly switch between sources of audio outputs while wearing the same TWS headset. Each user electronic device may have "soft" volume controls (i.e., software rendered) on a touch display that may be used while viewing visual content on the touch display. Alternatively, or in addition, each user electronic device may include "hard" volume controls (e.g., mechanically activated volume adjustment button, key or knob) that the user is quite familiar with activating to adjust sound volume. TWS usage can often lead to a volume control dilemma where users try to adjust the volume of audio output by toggling the volume controls on the device they are currently using, even when the source of the audio is a second device. When changing a source of an audio signal being presented by the TWS headset, the user may be inconvenienced by having to find the correct one of multiple electronic devices to adjust the sound volume. As an example, a user who is working on his laptop may be listening to an audio track being played by the user's mobile phone. The user may occasionally stream music from a music app on his laptop or from his tablet or alternatively from his mobile phone. If the user has to suddenly reduce the volume of the audio being outputted on the TWS headset (e.g., the user's superior walks into the work space to have a conversation), the user may instinctively reach for the laptop's volume controls to adjust/reduce the volume. It can take the user a few moments to realize that the audio source is not his laptop, leading to confusion and frustration as the user has to cycle through the different devices to find the one that is the correct source of the audio output in order to reduce the volume. The present disclosure provides a more intelligent solution for quickly adjusting the sound volume by not having to identify which user electronic device is providing the audio signal. Use of soft or hard volume controls on any of the connected devices will work to adjust the sound volume regardless of the source device.

In one or more embodiments, the first electronic device includes a memory, a first input control, a communications subsystem, and a controller communicatively coupled to the memory, the input control, and the communications subsystem. The controller is configured to cause the first electronic device to connect, via the communications subsystem, to a second electronic device having a second input control and establish an input sharing framework with the second electronic device. The controller is configured to cause the first electronic device to detect, via the input sharing framework established with the second electronic device, an audio output adjustment signal received from the second input control to change a volume of an audio output signal. The controller is configured to cause the first electronic device to determine whether the audio output signal is originating from the first electronic device and is being presented at one of a first audio output device of the first electronic device or an external audio output device communicatively coupled to the first electronic device. In response to determining that the audio output signal is originating from the first electronic device, the controller is configured to cause the first electronic device to adjust the volume of the audio output signal based on the audio output adjustment signal received from the second input control and to communicate the audio output signal at the adjusted volume to a corresponding one of the first audio output device or the external audio output device that presents the audio output signal.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements can be provided with similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 presents a simplified functional block diagram of an electronic device in which the features of the present disclosure are advantageously implemented for single volume control input between connected devices. In one or more embodiments, the electronic device includes additional communications functionality that enables electronic device to be referred to as communication device 100, which operates as a mobile user device in communication environment 101. Communication environment 101 includes at least one second electronic device. In an example, communication environment 101 includes two second electronic devices 102*a*-102*b*. Communication device 100 and at least one second electronic device 102*a* may respectively originate first audio output signal 103 and second audio output signal 104 that produces an audio output at either a corresponding integral audio output device 105 or external audio output device 106 (e.g., wireless earphone 106*a* or external wireless speaker 106*b* of FIG. 2) for consumption by user 107. Communication device 100 and at least one second electronic device 102*a* may communicatively couple via respective communications subsystem 108 and share interfaces and functions as part of input sharing framework 110. Communication device 100 includes at least one input control 112. For example, communication device 100 can include "soft" volume control 114 (i.e., software rendered) on touch display 116 and/or "hard" volume control 118 (e.g., mechanically activated volume adjustment button, key or knob). Second electronic device 102*a* may similarly include integral audio output device 105*a*, communications subsystem 108*a*, input control 112*a* (e.g., soft volume controls 114*a* on touch display 116*a* and hard volume controls 118*a*). Second electronic device 102*b* may similarly include integral audio output device 105*b*, communications subsystem 108*b*, input control 112*b* (e.g., soft volume controls 114*b* on touch display 116*b* and hard volume controls 118*b*). Input sharing framework 110 enables cooperative instant control of at least one input control 112 of communication device 100 and at least one input control 112*a* of second electronic device 102*a*. Controller 120 is configured to cause communication device 100 to provide functionality described herein.

Communication device 100 can be one of a host of different types of devices, including but not limited to, a mobile cellular phone, satellite phone, or smart phone, a laptop, a netbook, an ultra-book, a networked smartwatch, or networked sports/exercise watch, and/or a tablet computing device or similar device that can include wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a session initiation protocol (SIP) phone, a wireless local loop (WLL) station, a personal digital assistant (PDA), computer workstation, a handheld device having wireless connection capability, a computing device, or other processing devices. Second electronic device 102*a* may also be one of the host of different types of devices described above.

In addition to communications subsystem 108 and controller 120, communication device 100 may include memory subsystem 122, data storage subsystem 124, and input/output (I/O) subsystem 126. To enable management by controller 120, system interlink 128 communicatively connects controller 120 with communications subsystem 108, memory subsystem 122, data storage subsystem 124, and I/O subsystem 126. System interlink 128 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 128) are illustrated in FIG. 1, it is to be understood that more, fewer, or different interconnections may be present in other embodiments.

Controller 120 includes processor subsystem 130, which includes one or more central processing units (CPUs) or data processors. Processor subsystem 130 can include one or more digital signal processors (DSPs), graphics processing unit (GPU), image capture device (ICD) controller, and hardware acceleration (HA) unit that can be integrated with data processor(s). Processor subsystem 130 can, in some embodiments, include image signal processors (ISPs) (not shown) and dedicated artificial intelligence (AI) engines. In one or more embodiments, processor subsystem 130 can execute AI modules to provide AI functionality of AI engines. AI modules may include an artificial neural network, a decision tree, a support vector machine, Hidden Markov model, linear regression, logistic regression, Bayesian networks, and so forth. The AI modules can be individually trained to perform specific tasks and can be arranged in different sets of AI modules to generate different types of output. Processor subsystem 130 can interchangeably be referred to as controller 120.

For simplicity in describing the features of communication device 100, the functionality provided by one or more of CPU, DSP, GPU, ISP/ICD controller, etc. are collectively described as being performed by processor subsystem 130 (or controller 120). Collectively, components integrated within processor subsystem 130 support computing, classifying, processing, transmitting and receiving of data and information, and presenting of graphical images within a display, etc. Processor subsystem 130 can include other processors such as auxiliary processor(s) that may act as a low power consumption, always-on sensor hub for physical sensors. Controller 120 manages, and in some instances directly controls, the various functions and/or operations of communication device 100. These functions and/or operations include, but are not limited to including, application data processing, communication, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Memory subsystem 122, which can also be interchangeably referred to as memory 122, stores program code 132 for execution by processor subsystem 130 to provide the functionality described herein. Program code 132 includes applications such as first application 133, and other applications 135 that generate first audio output signal 103. Single input control module 136 enables cooperative input control between communication device 100 and second electronic device 102*a*. When communication device 100 communicatively couples to second electronic device 102*a*, activation of single input control modules 136 (i.e., instant control modules) at respective devices 100 and 102*a* are triggered. Upon detecting availability of cooperative "instant control" by establishing communication between single input control modules 136, each device 100 and 102*a* identifies to the other device 100 and 102*a* input control 112 and 112*a* available to act as a single input control for both devices 100 and 102*a*.

Figure 2:
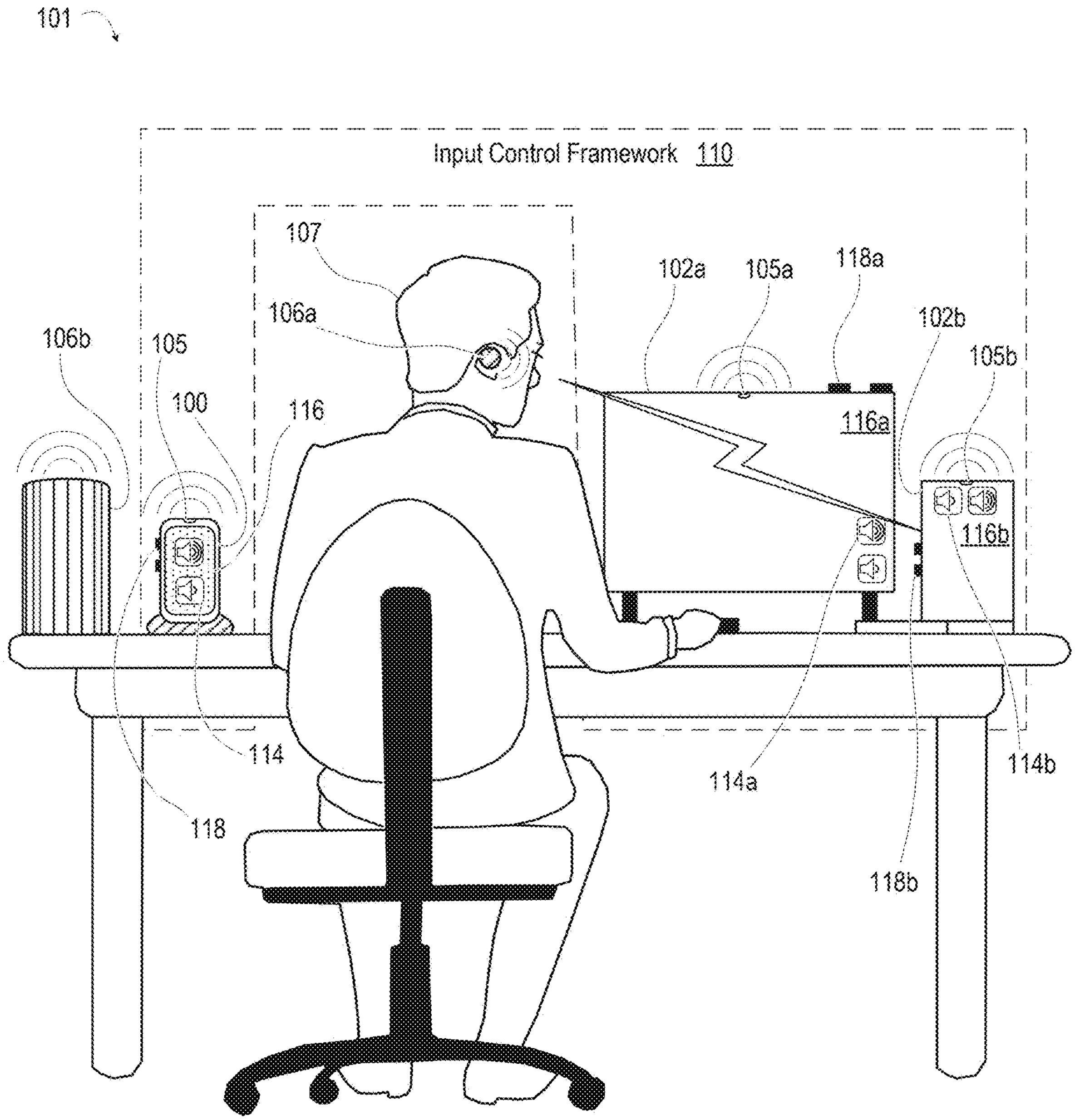
FIG. 2 is a front view of an example communication environment in which an electronic device is connected in an input sharing framework with two second electronic devices and two external audio output devices, according to one or more embodiments.

FIG. 2 is a front view of example communication environment 101 in which communication device 100 is connected in an input sharing framework 110 with two second electronic devices 102*a*-102*b*. In an example, second electronic device 102*a* is a desktop computer and second electronic device 102*b* is a laptop computer. Each device (100, 102*a*, and 102*b*) may stream an audio output signal to external audio output devices 106 (FIG. 1) such as wireless earphone 106*a* or external wireless speaker 106*b*. Respective input control 112, 112*a* and 112*b* of devices (100, 102*a*, and 102*b*) providing increase and decrease volume controls for integral audio output devices 105*a*-105*c*, wireless earphone 106*a*, and external wireless speaker 106*b*. Other volume controls may be included such as volume off. When establishing input control framework 110, each device (100, 102*a*, and 102*b*) may identify the integral volume control (112, 112*a* and 112*b*) to other devices (100, 102*a*, and 102*b*). When one of the identified input control (112, 112*a* and 112*b*) is actuated by user 107, the corresponding device (100, 102*a*, or 102*b*) that includes the input control determines whether the input control is directed to local integral audio output device (105, 105*a*, or 105*b*) other integral audio output device 105 corresponding to the other device(s) (100, 102*a*, or 102*b*) or external audio output devices (106*a* and 106*b*). When the audio source or the output device is not the local device, the corresponding device (100, 102*a*, or 102*b*) communicates the user input to the other devices (100, 102*a*, or 102*b*). The other devices (100, 102*a*, or 102*b*) receiving the user input responds in a similar manner as if the user 107 input had originated from an input control corresponding to the other devices (100, 102*a*, and/or 102*b*).

With continuing reference to FIG. 1, in one or more embodiments, several of the described aspects of the present disclosure are provided via executable program code 132 of applications, and particularly single input control module 136, executed by controller 120. In one or more embodiments, program code 132 may be integrated into a distinct chipset or hardware module as firmware that operates separately from executable program code. Portions of program code 132 may be incorporated into different hardware components that operate in a distributed or collaborative manner. Memory subsystem 122 further includes operating system (OS), firmware interface, such as basic input/output system (BIOS) or Uniform Extensible Firmware Interface (UEFI), and firmware, which also includes and may thus be considered as program code 132.

Program code 132 may access, use, generate, modify, store, or communicate computer data 140, such as TWS configuration data 142 that supports, and is updated by, single input control module 136. Computer data 140 may incorporate "data" that originated as raw, real-world "analog" information that consists of basic facts and figures. Computer data 140 includes different forms of data, such as numerical data, images, coding, notes, and financial data. Computer data 140 may originate at communication device 100 or be retrieved from a remote device via communications subsystem 108. Communication device 100 may store, modify, present, or transmit computer data 140 such as audio output signal 103. Computer data 140 may be organized in one of a number of different data structures. Common examples of computer data 140 include video, graphics, text, and images. Computer data 140 can also be in other forms of flat files, databases, and other data structures.

According to aspects of the present disclosure, single input control module 136 enhances control capabilities by providing single input control, which allows user 107 to utilize the most convenient input controls to adjust volume of audio output without the frustration of having to keep track of the specific device source of the audio output signal. These applications/modules may be software or firmware that, when executed by controller 120, configures communication device 100 to provide functionality described herein.

Data storage subsystem 124 of communication device 100 includes data storage device(s) 148. Controller 120 is communicatively connected, via system interlink 128, to data storage device(s) 148. Data storage subsystem 124 provides program code 132 and computer data 140 stored on non-volatile storage that is accessible by controller 120. For example, data storage subsystem 124 can provide a selection of program code 132 and computer data 140. These applications can be loaded into memory subsystem 122 for execution/processing by controller 120. In one or more embodiments, data storage device(s) 148 can include hard disk drives (HDDs), optical disk drives, and/or solid-state drives (SSDs), etc. Data storage subsystem 124 of communication device 100 can include removable storage device(s) (RSD(s)) 150, which is received in RSD interface 152. Controller 120 is communicatively connected to RSD 150, via system interlink 128 and RSD interface 152. In one or more embodiments, RSD 150 is a non-transitory computer program product or computer readable storage device that stores program code and/or instructions that may be executed by a processor associated with a user device such as communication device 100. Controller 120 can access data storage device(s) 148 or RSD 150 to provision communication device 100 with program code 132 and computer data 140.

I/O subsystem 126 may include internal input devices 154 such as microphone 156, image capturing device(s) 155, and touch input devices 158 (e.g., screens, keys, or buttons). I/O subsystem 126 may include physical buttons/actuators 159 that can be located on a periphery of the device housing. In one or more embodiments, hard volume controls 118 are a subset of physical buttons 159. Hard volume controls 118 is an example of physical buttons 159. In one or more embodiments, I/O subsystem 126 may include internal output devices 162 such as integral audio output devices 105, touch display 116, lights 166, and vibratory or haptic output devices 168.

According to aspects of the present disclosure, controller 120 is configured to cause communication device 100 to connect, via communications subsystem 108, to second electronic device 102*a* having a second input control (e.g., soft and hard volume controls 114*a* and 118*a*). Controller 120 is configured to cause communication device 100 to establish input sharing framework 110 with second electronic device 102*a*. Controller 120 is configured to cause communication device 100 to detect, via input sharing framework 110 established with second electronic device 102*a*, an audio output adjustment signal received from the second user input device (114*a* or 118*a*) to change a volume of audio output signal (103 or 104). Controller 120 determines whether the audio output signal is originating from communication device 100 and is being presented at one of a "first" integral audio output device 105 of communication device 100 or external audio output device 106 communicatively coupled to communication device 100. In response to determining that audio output signal 103 is originating from communication device 100, controller 120 is configured to cause communication device 100 to adjust the volume of audio output signal 103 based on the audio output adjustment signal received from second input control (114*a* or 118*a*). Controller 120 is configured to cause communication device 100 to communicate audio output signal 103 at the adjusted volume to a corresponding one of the "first" integral audio output device 105 or external audio output device 106 that presents audio output signal 103.

In one or more embodiments, controller 120 is configured to cause communication device 100 to connect, via communication subsystem 108 and input sharing framework 110, to an audio output device receiving audio output signal 104 from second electronic device 102*a*. The audio output device may be: (i) "second" audio output device 105 integral to the second electronic device 102*a*; or (ii) external audio output device 106 that is configured to receive and present audio output signals 103 and 104 originating respectively from both first electronic device 100 and second electronic device 102*a*. Controller 120 detects an audio adjustment signal received from the "first" integral input control 112 of communication device 100 to change a volume of audio output signal 104. In response to subsequently determining that audio output signal 104 is not originating from communication device 100, controller 120 is configured to cause communication device 100 to communicate the audio adjustment signal to second electronic device 102*a* via input sharing framework 110 to prompt second electronic device 102*a* to communicate audio output signal 104 at the adjusted volume to the corresponding one of second audio output device 105 or external audio output device 106.

In one or more embodiments, external audio output device 106 is or includes a multipoint audio output device that is concurrently communicatively coupled to second electronic device 102*a*. External audio output device 106 is configured to receive and present audio output signal 103 from communication device 100 or audio output signal 104 from second electronic device 102*a*. In response to receiving a subsequent second volume adjustment at "first" input control 112, controller 120 is configured to cause communication device 100 to determine whether the audio output signal being presented by external audio output devices 106 device is originating from communication device 100. In response to determining that the audio output signal is no longer originating from communication device 100, controller 120 is configured to cause communication device 100 to communicate the second volume adjustment received at "first" input control 112 to second electronic device 102*a* to trigger an adjustment of the volume of audio output signal 104 via second electronic device 102*a*.

In one or more particular embodiments, external audio output device 106 is a multipoint audio output device that is configured to concurrently present a combined audio output signal including first audio output signal 103 received from communication device 100 and second audio output signal 104 received from second electronic device 102*a*. Controller 120 is configured to cause communication device 100 to determine that that communication device 100 is communicating first audio output signal 103 to external audio output device 106 that is multipoint. In response to subsequently receiving a volume adjustment at first input control 112, controller 120 is configured to cause communication device 100 to adjust volume of first audio output signal 103. Controller 120 is configured to cause communication device 100 to communicate the volume adjustment to second electronic device 102*a* to prompt a concurrent volume adjustment of second audio output signal 104. Controller 120 is configured to cause communication device 100 to communicate first audio output signal 103 at the adjusted volume to external audio output device 106.

Figure 3:
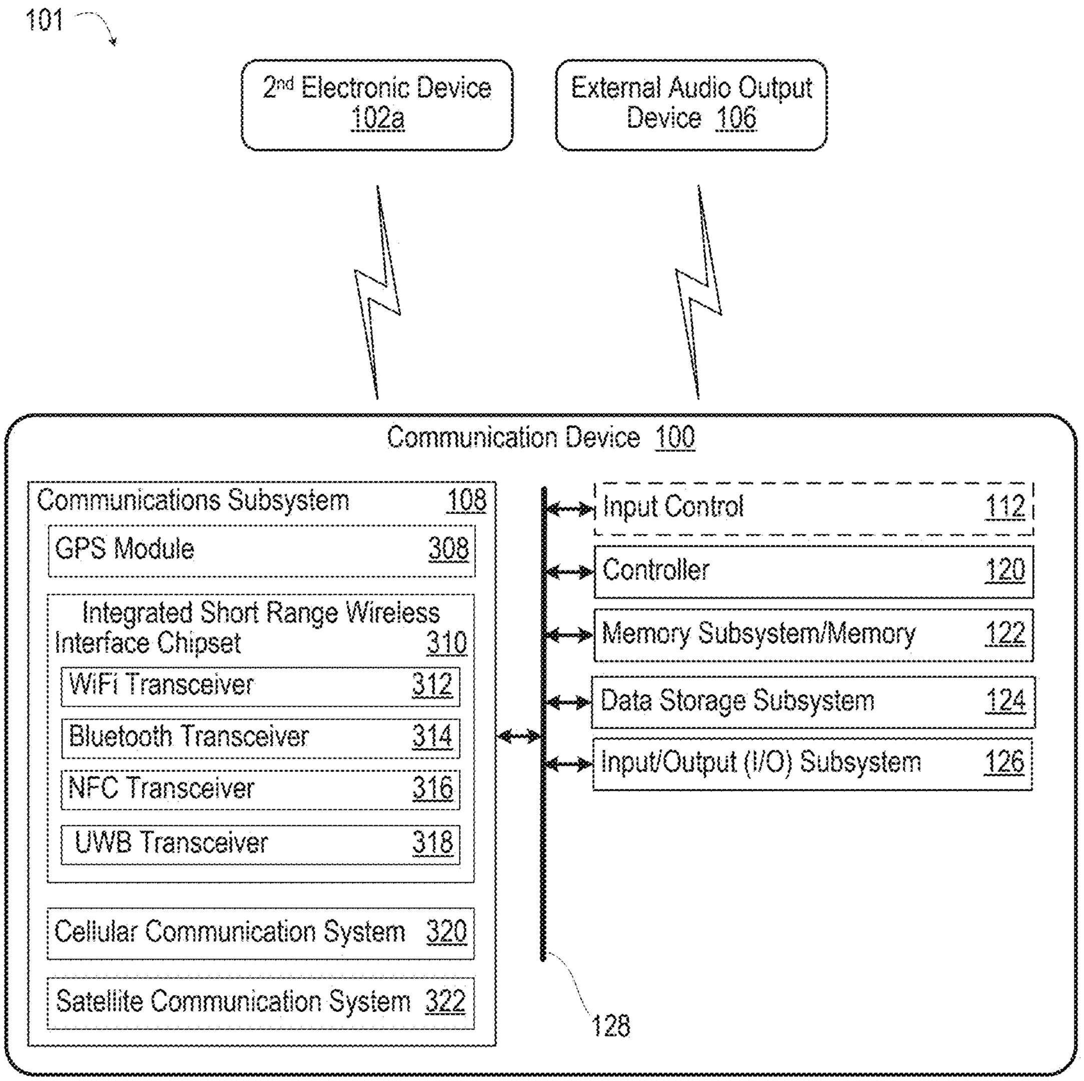
FIG. 3 is a simplified block diagram of communication device 100 having additional communication interfaces for wireless communications, according to one or more embodiments.

FIG. 3 is a simplified block diagram of communication device 100 having additional communication interfaces for wireless communications. In one or more embodiments, controller 120, via communications subsystem 108, performs multiple types of cellular over-the-air (OTA) or wireless communication, such as by using a Bluetooth connection or other personal access network (PAN) connection. In an example, a user may wear a health monitoring device such as a smartwatch that is communicatively coupled via a wireless connection. In one or more embodiments, communications subsystem 108 includes a global positioning system (GPS) module 308 that receives GPS broadcasts from GPS satellites to obtain geospatial location information. In one or more embodiments, controller 120, via communications subsystem 108, communicates via a wireless local area network (WLAN) link using one or more IEEE 802.11 WLAN protocols with an access point. In one or more embodiments, controller 120, via communications subsystem 108, may communicate via an OTA cellular connection with radio access networks (RANs). In an example, communication device 100, via communications subsystem 108, connects via RANs of a terrestrial network that is communicatively connected to a network server. In one or more embodiments, communications subsystem 108 includes integrated short range wireless interface chipset 310 having one or more of Wi-Fi component 312, Bluetooth (BT) transceiver (TxRx) 314, near field communication (NFC) transceiver 316, and ultra-wideband transceiver 318. In one or more embodiments, communications subsystem 108 further includes long distance communication capabilities including cellular communication system 320 and satellite communication system 322.

Figure 4A:
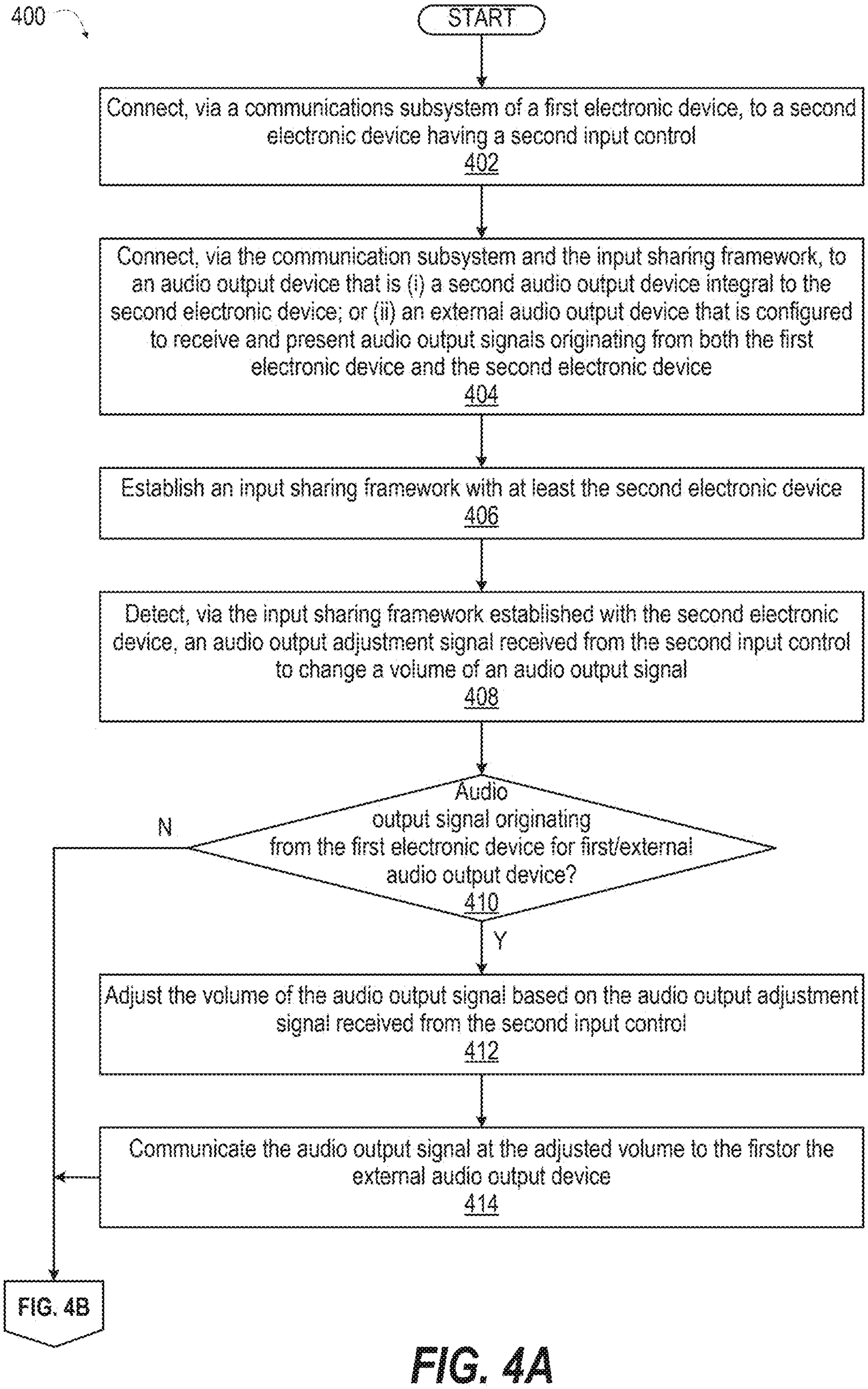
FIGS. 4A-4B (collectively "FIG. 4") present a flow diagram illustration of a method for implementing single control of volume across connected devices, according to one or more embodiments.
Figure 4B:
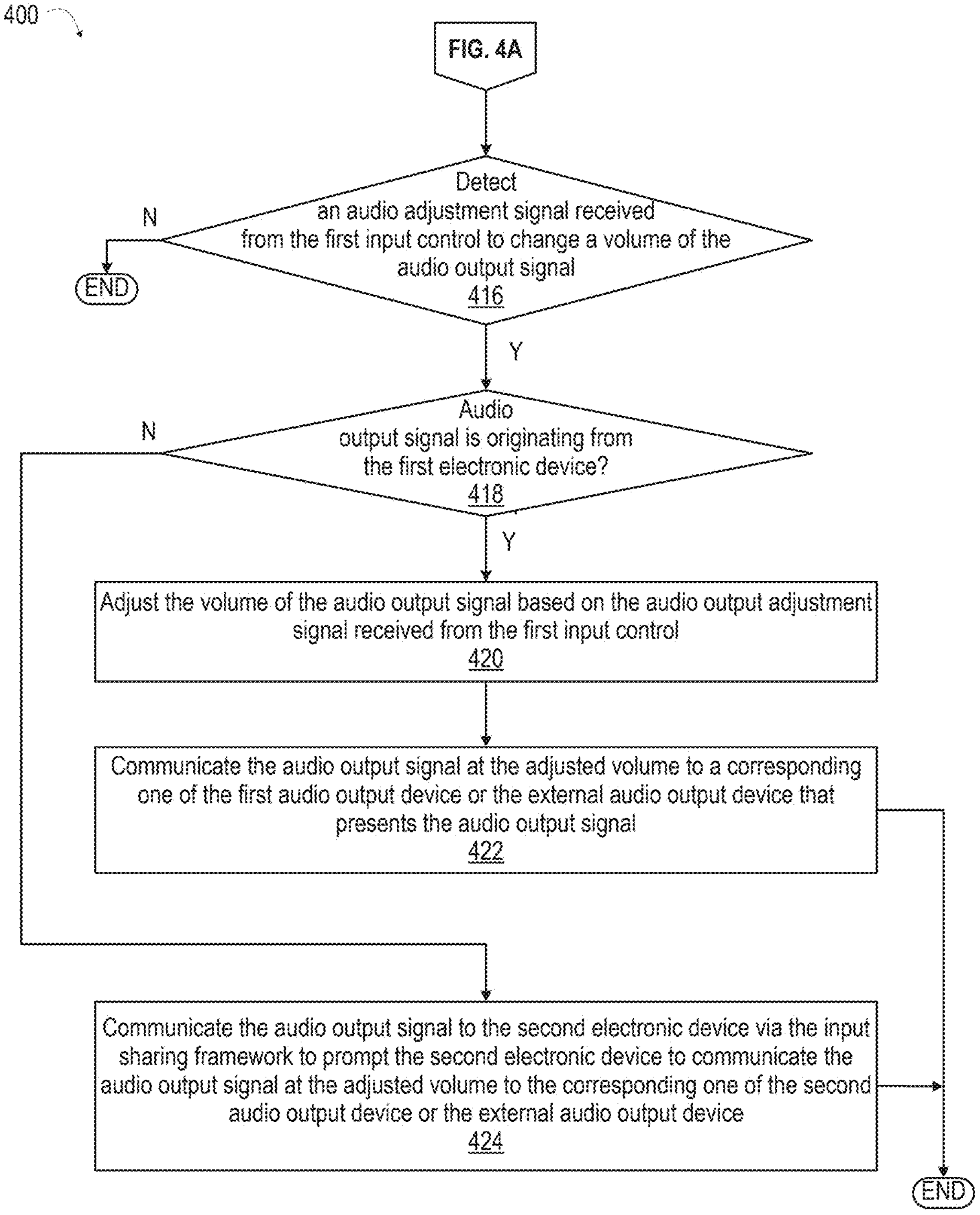
Figure 5:
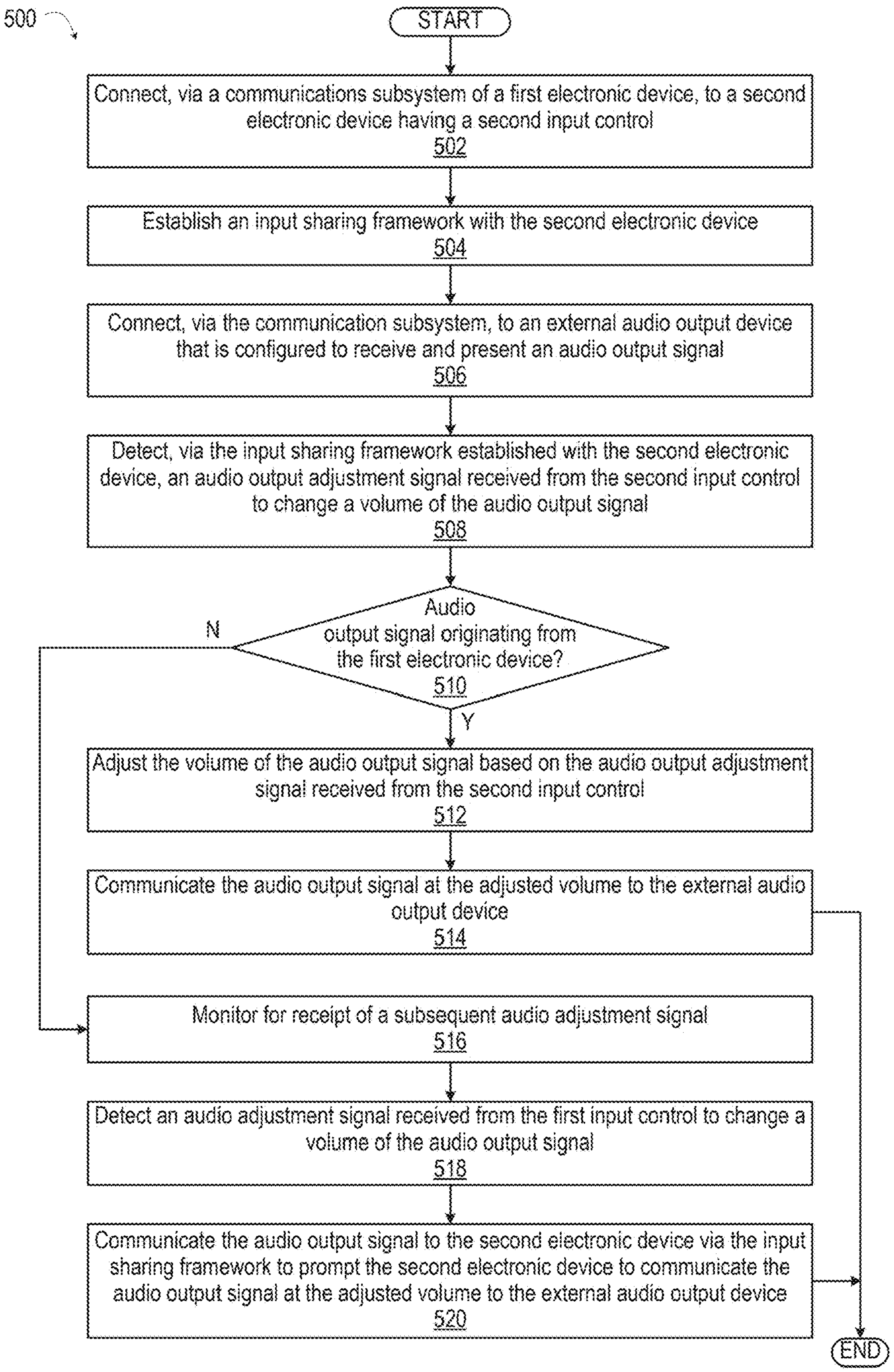
FIG. 5 presents a flow diagram illustration of a method of providing an input sharing framework between connected devices to allow each device to control a volume of an audio output signal communicated to an external audio output device, according to one or more embodiments.
Figure 6A:
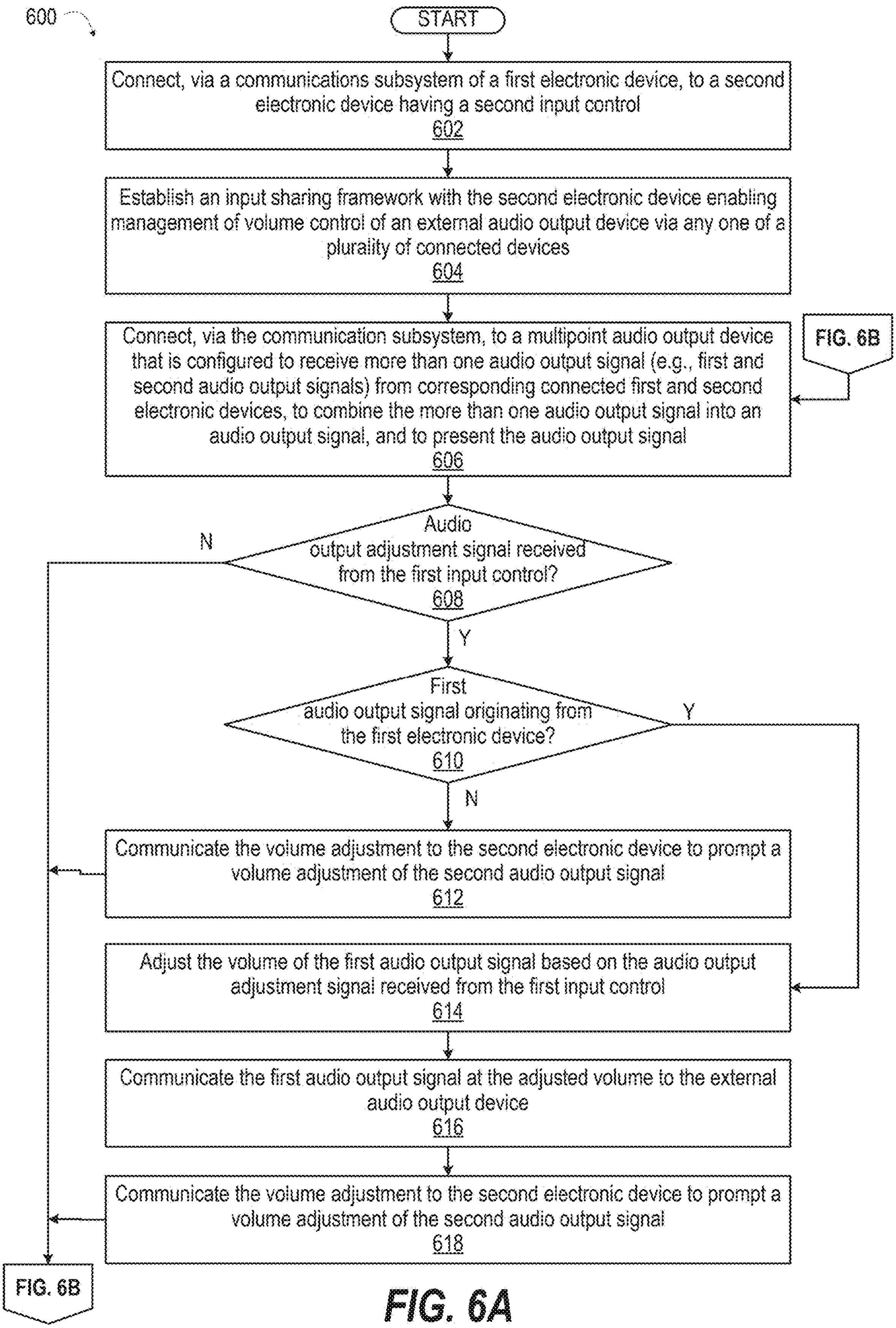
FIGS. 6A-6B (collectively "FIG. 6") present a flow diagram illustration of a method of providing an input sharing framework between connected devices to allow each device to control a volume of an audio output signal communicated to an external multipoint audio output device capable of connecting concurrently to more than one device to concurrently receive and present more than one audio output signal, according to one or more embodiments.
Figure 6B:
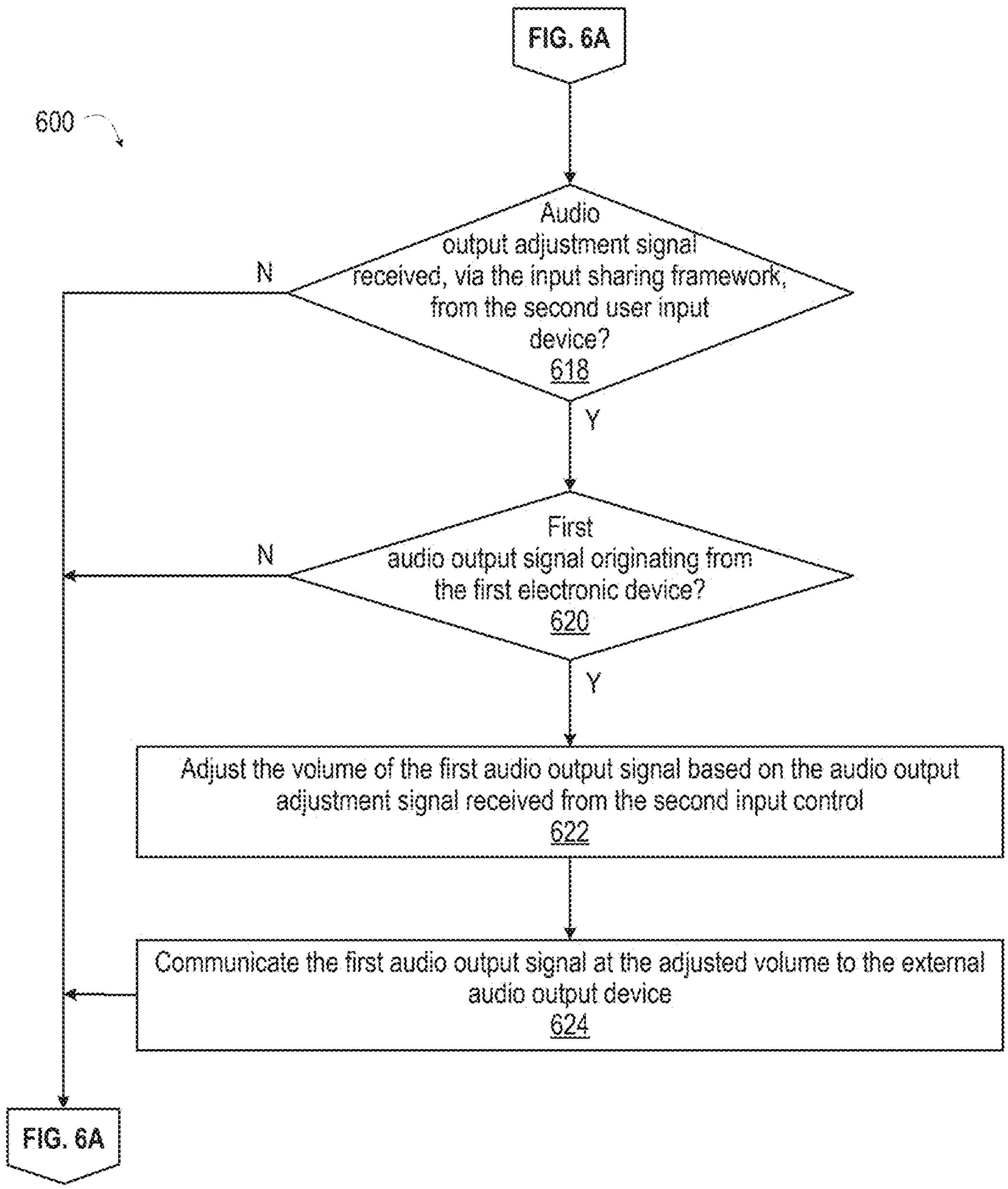

FIGS. 4A-4B (collectively "FIG. 4") presents a flow diagram illustration of method 400 for implementing single control of volume across connected devices. Audio output may come from one or more of the connected devices and an external audio output device. FIGS. 5A-5B (collectively "FIG. 5") present a flow diagram illustration of method 500 of providing an input sharing framework between connected devices to each control a volume of an audio output signal communicated to an external audio output device. In one or more embodiments, the external audio output device may be only capable of connecting with one device at time to receive an audio output signal. In one or more embodiments, the external audio device is a multiple audio output device that is capable of connecting to a plurality of connected devices to receive and present one audio output signal from one of the plurality of connected device. FIGS. 6A-6B (collectively "FIG. 6") present a flow diagram illustration of method 600 of providing an input sharing framework between connected devices to each control a volume of an audio output signal communicated to an external multipoint audio output device capable of connecting concurrently to more than one device to concurrently receive and present more than one audio output signal. The descriptions of method 400 (FIG. 4), method 500 (FIG. 5) and method 600 (FIG. 6) are provided with general reference to the specific components illustrated within the preceding FIGS. 1-3. Specific components referenced in method 400 (FIG. 4), method 500 (FIG. 5) and method 600 (FIG. 6) may be identical or similar to components of the same name used in describing preceding FIGS. 1-3. In one or more embodiments, controller 120 (FIG. 1) configures communication device 100 (FIG. 1) or a similar computing device to provide the described functionality of method 400 (FIG. 4), method 500 (FIG. 5) and method 600 (FIG. 6). For clarity method 400 (FIG. 4), method 500 (FIG. 5), and method 600 (FIG. 6) describe first and second electronic devices. However, the second electronic device may be part of a plurality of second electronic devices that are connected to the first electronic device and participate in the input sharing framework.

With reference to FIG. 4A, method 400 includes connecting, via a communications subsystem of a first electronic device, to a second electronic device having a second input control (block 402). Input control may be a software rendered control on a touch display. Input control may be a mechanically actuated device (e.g., 118, FIG. 1). In one or more embodiments, method 400 includes connecting, via the communication subsystem and the input sharing framework, to an audio output device that is one of: (i) a second audio output device integral to the second electronic device; or (ii) an external audio output device that is configured to receive and present audio output signals originating from both the first electronic device and the second electronic device (block 404). Method 400 includes establishing an input sharing framework with at least the second electronic device (block 406). Method 400 includes detecting, via the input sharing framework established with the second electronic device, an audio output adjustment signal received from the second input control to change a volume of an audio output signal (block 408). Method 400 includes determining whether the audio output signal is originating from the first electronic device and is being presented at one of a first audio output device of the first electronic device or an external audio output device communicatively coupled to the first electronic device (decision block 410). In response to determining that the audio output signal is originating from the first electronic device, method 400 includes adjusting the volume of the audio output signal based on the audio output adjustment signal received from the second input control (block 412). Method 400 includes communicating the audio output signal at the adjusted volume to a corresponding one of the first audio output device or the external audio output device that presents the audio output signal (block 414). In response to determining that the audio output signal is not originating from the first electronic device in decision block 410 or communicating the audio output signal at the adjusted volume in block 414, method 400 proceeds to block 416 of FIG. 4B.

With reference to FIG. 4B, method 400 includes determining whether an audio adjustment signal is received from the first input control to change a volume of the audio output signal (decision block 416). In response to determining that an audio adjustment signal is not received from the first input control to change a volume of the audio output signal, method 400 ends. In response to determining that an audio adjustment signal is received from the first input control to change a volume of the audio output signal, method 400 includes determining whether the audio output signal is originating from the first electronic device (decision block 418). In response to subsequently determining that the audio output signal is originating from the first electronic device, method 400 includes adjusting the volume of the audio output signal based on the audio output adjustment signal received from the first input control (block 420). Method 400 includes communicating the audio output signal at the adjusted volume to a corresponding one of the first audio output device or the external audio output device that presents the audio output signal (block 422). Then method 400 ends. In response to determining that the audio output signal is not originating from the first electronic device in decision block 418, method 400 includes communicating the audio adjustment signal to the second electronic device via the input sharing framework to prompt the second electronic device to communicate the audio output signal at the adjusted volume to the corresponding one of the second audio output device or the external audio output device (block 424). Then method 400 ends.

In one or more embodiments, the external audio output device is or includes a multipoint audio output device that is concurrently communicatively coupled to the second electronic device and configured to receive and present an audio output signal from one of the first and the second electronic device. In response to receiving a second volume adjustment at the first input control, method 400 may further include determining whether the audio output signal being presented by the external audio output device is still originating from the first electronic device. In response to determining that the audio output signal is no longer originating from the first electronic device, method 400 may further include communicating the second volume adjustment received at the first input control to the second electronic device to trigger an adjustment of the volume of the audio output signal via the second electronic device.

In one or more particular embodiments, the multipoint audio output device is configured to concurrently present the audio output signal comprising a first audio output signal received from the first electronic device and a second audio output signal received from the second electronic device. In one or more specific embodiments, method 400 may further include determining that that the first electronic device is communicating the first audio output signal to the multipoint audio output device. In response to subsequently receiving a volume adjustment at the first input control, method 400 may further include adjusting volume of the first audio output signal. Method 400 may further include communicating the volume adjustment to the second electronic device to prompt a concurrent volume adjustment of the second audio output signal. Method 400 may further include communicating the first audio output signal at the adjusted volume to the multipoint audio output device.

With reference to FIG. 5, method 500 includes connecting, via a communications subsystem of a first electronic device, to a second electronic device having a second input control (block 502). Method 500 includes establishing an input sharing framework with the second electronic device (block 504). Method 500 includes connecting, via the communication subsystem, to an external audio output device that is configured to receive and present an audio output signal (block 506). Method 500 includes detecting, via the input sharing framework established with the second electronic device, an audio output adjustment signal received from the second input control to change a volume of the audio output signal (block 508). Method 500 includes determining whether the audio output signal is originating from the first electronic device (decision block 510). In response to determining that the audio output signal is originating from the first electronic device, method 500 includes adjusting the volume of the audio output signal based on the audio output adjustment signal received from the second input control (block 512). Method 500 includes communicating the audio output signal at the adjusted volume to the external audio output device (block 514). Then method 500 ends.

Following the determination that the audio output signal is not originating from the first electronic device in decision block 510, method 500 transitions to monitor for receipt of a subsequent audio adjustment signal (block 516). Method 500 includes detecting an audio adjustment signal received from the first input control to change a volume of the audio output signal (block 518). Method 400 includes communicating the audio adjustment signal to the second electronic device via the input sharing framework to prompt the second electronic device to communicate the audio output signal at the adjusted volume to the external audio output device (block 520). Then method 400 ends.

With reference to FIG. 6A, method 600 includes connecting, via a communications subsystem of a first electronic device, to a second electronic device having a second input control (block 602). Method 600 includes establishing an input sharing framework with the second electronic device enabling management of volume control of an external audio output device via any one of a plurality of connected devices (block 604). Method 600 includes connecting, via the communication subsystem, to a multipoint audio output device that is configured to receive more than one audio output signal (e.g., first and second audio output signals) from corresponding connected first and second electronic devices, to combine the more than one audio output signal into a combined audio output signal, and to present the combine audio output signal (block 606). The input sharing framework may enable controlling the volume of the audio output signal from any one of a plurality of connected devices. Method 600 includes monitoring the first input control and monitoring the second input control via the input sharing framework to detect an audio output adjustment signal (block 608). Method 600 includes determining whether an audio output adjustment signal is received from the first input control (e.g., manual volume control(s) or a touch display) to change a volume of the audio output signal (decision block 610). In response to determining that an audio output adjustment signal is received from the first input control, method 600 includes determining whether the first audio output signal is originating from the first electronic device (decision block 612). In response to determining that the first audio output signal is not originating from the first electronic device, method 600 includes communicating the volume adjustment to the second electronic device to prompt a volume adjustment of the second audio output signal (block 614). In response to determining that the first audio output signal is originating from the first electronic device, method 600 includes adjusting the volume of the first audio output signal based on the audio output adjustment signal received from the first input control (block 616). Method 600 includes communicating the first audio output signal at the adjusted volume to the external audio output device (block 618). Method 600 includes communicating the volume adjustment to the second electronic device to prompt a volume adjustment of the second audio output signal (block 620). In response to determining that an audio output adjustment signal is not received from the first input control in decision block 610 or after either block 614 or 620, method 600 proceeds to decision block 622 of FIG. 6B.

With reference to FIG. 6B, method 600 includes determining whether an audio output adjustment signal is received, via the input sharing framework, from the second input control (e.g., manual volume control(s) or a touch display) to change a volume of the audio output signal (decision block 622). In response to determining an audio output adjustment signal is not received from the second input control, method 600 returns to block 606. In response to determining that an audio output adjustment signal is received from the second input control in decision block 616, method 600 includes determining whether the first audio output signal is originating from the first electronic device (decision block 620). In response to determining that the audio output signal is not originating from the first electronic device, method 600 returns to block 606. In response to determining that the first audio output signal is originating from the first electronic device, method 600 includes adjusting the volume of the first audio output signal based on the audio output adjustment signal received from the second input control (block 622). Method 600 includes communicating the first audio output signal at the adjusted volume to the external audio output device (block 624). Then method returns to block 606.

According to aspects of the present disclosure, communication device 100 (FIG. 1), methods 400 (FIG. 4), 500 (FIG. 5) and 600 (FIG. 6), and computer program product, such as RSD 150 (FIG. 1), provide a single input volume control across connected devices. The present disclosure enables a user to control the volume of the audio output originating from any one of the connected devices using the controls of any one of the connected devices.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A first electronic device comprising:

a first input control;

a communications subsystem; and a controller communicatively coupled to the first input control, the communications subsystem, and which is configured to cause the first electronic device to:

connect, via the communications subsystem, to a second electronic device having a second input control;

establish an input sharing framework with the second electronic device;

detect, via the input sharing framework established with the second electronic device, an audio output adjustment signal received from the second input control to change a volume of an audio output signal;

determine whether the audio output signal is originating from the first electronic device and is being presented at one of a first audio output device of the first electronic device or an external audio output device communicatively coupled to the first electronic device; and in response to determining that the audio output signal is originating from the first electronic device:

adjust the volume of the audio output signal based on the audio output adjustment signal received from the second input control; and communicate the audio output signal at the adjusted volume to a corresponding one of the first audio output device or the external audio output device that presents the audio output signal.

2. The first electronic device of claim 1, wherein the first audio output device is integral to the first electronic device and is communicatively coupled to the controller.

3. The first electronic device of claim 1, wherein the controller configures the first electronic device to:

connect, via the communications subsystem and the input sharing framework, to an audio output device, wherein the first audio output device is one from among a group comprising: (i) a second audio output device integral to the second electronic device; and (ii) the external audio output device that is configured to receive and present audio output signals originating from both the first electronic device and the second electronic device;

detect an audio adjustment signal received from the first input control to change a volume of the audio output signal; and in response to subsequently determining that the audio output signal is not originating from the first electronic device:

communicate the audio adjustment signal to the second electronic device via the input sharing framework to prompt the second electronic device to communicate the audio output signal at the adjusted volume to the corresponding one of the second audio output device or the external audio output device.

4. The first electronic device of claim 1, wherein:

the external audio output device comprises a multipoint audio output device that is concurrently communicatively coupled to the second electronic device and configured to receive and present an audio output signal from one of the first and the second electronic device; and the controller configures the first electronic device to:

in response to receiving a second volume adjustment at the first input control:

determine whether the audio output signal being presented by the external audio output device is still originating from the first electronic device; and in response to determining that the audio output signal is no longer originating from the first electronic device, communicate the second volume adjustment received at the first input control to the second electronic device to trigger an adjustment of the volume of the audio output signal via the second electronic device.

5. The first electronic device of claim 4, wherein the multipoint audio output device is configured to concurrently present the audio output signal comprising a first audio output signal received from the first electronic device and a second audio output signal received from the second electronic device.

6. The first electronic device of claim 5, wherein the controller configures the first electronic device to:

determine that the first electronic device is communicating the first audio output signal to the multipoint audio output device; and in response to subsequently receiving a volume adjustment at the first input control:

adjust the volume of the first audio output signal;

communicate the volume adjustment to the second electronic device to prompt a concurrent volume adjustment of the second audio output signal; and communicate the first audio output signal at the adjusted volume to the multipoint audio output device.

7. The first electronic device of claim 1, further comprising a memory subsystem that stores a first instant control module and is communicatively coupled to the controller, and wherein the controller executes the first instant control module to configure the first electronic device to communicate with a second instant control module executed by the second electronic device to enable instant control of volume adjustment of the corresponding one of the first audio output device, the external audio output device, or a second audio output device of the second electronic device.

8. The first electronic device of claim 1, wherein the first input control comprises at least one manual volume control.

9. The first electronic device of claim 1, wherein the first input control comprises a touch display.

10. A method comprising:

connecting, via a communications subsystem of a first electronic device, to a second electronic device having a second input control;

establishing an input sharing framework with the second electronic device;

detecting, via the input sharing framework established with the second electronic device, an audio output adjustment signal received from the second input control to change a volume of an audio output signal;

determining whether the audio output signal is originating from the first electronic device and is being presented at one of a first audio output device of the first electronic device or an external audio output device communicatively coupled to the first electronic device; and in response to determining that the audio output signal is originating from the first electronic device:

adjusting the volume of the audio output signal based on the audio output adjustment signal received from the second input control; and communicating the audio output signal at the adjusted volume to a corresponding one of the first audio output device or the external audio output device that presents the audio output signal.

11. The method of claim 10, wherein the first audio output device is integral to the first electronic device.

12. The method of claim 10, further comprising:

connecting, via the communications subsystem and the input sharing framework, to an audio output device, wherein the audio output device is one from among a group comprising: (i) a second audio output device integral to the second electronic device; and (ii) the external audio output device that is configured to receive and present audio output signals originating from both the first electronic device and the second electronic device;

detecting an audio adjustment signal received from the first input control to change a volume of the audio output signal; and in response to subsequently determining that the audio output signal is not originating from the first electronic device, communicating the audio adjustment signal to the second electronic device via the input sharing framework to prompt the second electronic device to communicate the audio output signal at the adjusted volume to the corresponding one of the second audio output device or the external audio output device.

13. The method of claim 10, wherein:

the external audio output device comprises a multipoint audio output device that is concurrently communicatively coupled to the second electronic device and configured to receive and present an audio output signal from one of the first and the second electronic device, and the method further comprises:

in response to receiving a second volume adjustment at the first input control:

determining whether the audio output signal being presented by the external audio output device is still originating from the first electronic device; and in response to determining that the audio output signal is no longer originating from the first electronic device, communicating the second volume adjustment received at the first input control to the second electronic device to trigger an adjustment of the volume of the audio output signal via the second electronic device.

14. The method of claim 13, wherein the multipoint audio output device is configured to concurrently present the audio output signal comprising a first audio output signal received from the first electronic device and a second audio output signal received from the second electronic device.

15. The method of claim 14, further comprising:

determining that the first electronic device is communicating the first audio output signal to the multipoint audio output device; and in response to subsequently receiving a volume adjustment at the first input control:

adjusting the volume of the first audio output signal;

communicating the volume adjustment to the second electronic device to prompt a concurrent volume adjustment of the second audio output signal; and communicating the first audio output signal at the adjusted volume to the multipoint audio output device.

16. A computer program product comprising:

a computer readable storage device; and program code on the computer readable storage device that when executed by a processor associated with a first electronic device, the program code configures the first electronic device to provide functionality of:

connecting, via a communications subsystem of a first electronic device, to a second electronic device having a second input control;

establishing an input sharing framework with the second electronic device;

detecting, via the input sharing framework established with the second electronic device, an audio output adjustment signal received from the second input control to change a volume of an audio output signal;

determining whether the audio output signal is originating from the first electronic device and is being presented at one of a first audio output device of the first electronic device or an external audio output device communicatively coupled to the first electronic device; and in response to determining that the audio output signal is originating from the first electronic device:

adjusting the volume of the audio output signal based on the audio output adjustment signal received from the second input control; and communicating the audio output signal at the adjusted volume to a corresponding one of the first audio output device or the external audio output device that presents the audio output signal.

17. The computer program product of claim 16, wherein the program code configures the first electronic device to provide functionality of:

connecting, via the communications subsystem and the input sharing framework, to audio output device, wherein the first audio output device is one from among a group comprising: (i) a second audio output device integral to the second electronic device; and (ii) the external audio output device that is configured to receive and present audio output signals originating from both the first electronic device and the second electronic device;

detecting an audio adjustment signal received from the first input control to change a volume of the audio output signal; and in response to subsequently determining that the audio output signal is not originating from the first electronic device, communicating the audio adjustment signal to the second electronic device via the input sharing framework to prompt the second electronic device to communicate the audio output signal at the adjusted volume to the corresponding one of the second audio output device or the external audio output device.

18. The computer program product of claim 16, wherein the external audio output device comprises a multipoint audio output device that is concurrently communicatively coupled to the second electronic device and configured to receive and present an audio output signal from one of the first and the second electronic device, and the program code configures the first electronic device to provide functionality of:

in response to receiving a second volume adjustment at the first input control:

determining whether the audio output signal being presented by the external audio output device is still originating from the first electronic device; and in response to determining that the audio output signal is no longer originating from the first electronic device, communicating the second volume adjustment received at the first input control to the second electronic device to trigger an adjustment of the volume of the audio output signal via the second electronic device.

19. The computer program product of claim 18, wherein the multipoint audio output device is configured to concurrently present the audio output signal comprising a first audio output signal received from the first electronic device and a second audio output signal received from the second electronic device.

20. The computer program product of claim 19, wherein the program code configures the first electronic device to provide functionality of:

determining that the first electronic device is communicating the first audio output signal to the multipoint audio output device; and in response to subsequently receiving a volume adjustment at the first input control:

adjusting the volume of the first audio output signal;
communicating the volume adjustment to the second electronic device to prompt a concurrent volume adjustment of the second audio output signal; and
communicating the first audio output signal at the adjusted volume to the multipoint audio output device.

* * * * *